United States Patent [19]

Schaefer et al.

[11] 4,430,448
[45] Feb. 7, 1984

[54] ELASTIC MOLDED BODY COMPRISING A CELL STRUCTURE AND PROCESS FOR PRODUCING SUCH A MOLDED BODY

[76] Inventors: Philipp Schaefer, Oberstrasse 16; Carsten Picker, Arndtstrasse 24, both of D-3000 Hanover 1; Helmut Schaefer, Winzlerstrasse 114, D-6780 Pirmasens-Pfalz, all of Fed. Rep. of Germany

[21] Appl. No.: 386,589

[22] Filed: Jun. 9, 1982

[30] Foreign Application Priority Data

Jun. 11, 1981 [DE] Fed. Rep. of Germany ....... 3123062

[51] Int. Cl.$^3$ .............................................. C08J 9/32
[52] U.S. Cl. ..................... 521/54; 521/137; 525/125; 525/129
[58] Field of Search .................. 521/54, 137; 525/125, 525/129

[56] References Cited

U.S. PATENT DOCUMENTS

| | | | |
|---|---|---|---|
| 3,592,782 | 7/1971 | Weber et al. | 521/54 |
| 3,842,020 | 10/1974 | Garrett | 521/54 |
| 3,878,133 | 4/1975 | Rubens | 521/54 |
| 3,892,819 | 7/1975 | Najvar | 521/54 |
| 3,960,583 | 6/1976 | Netting et al. | 521/54 |
| 4,005,033 | 1/1977 | Georgean et al. | 521/54 |
| 4,038,238 | 7/1977 | Cravens | 521/54 |
| 4,082,703 | 4/1978 | Nuffy et al. | 521/54 |
| 4,107,134 | 8/1978 | Dawsons | 521/54 |
| 4,108,806 | 8/1978 | Cohrs et al. | 521/54 |
| 4,255,524 | 3/1981 | Dawsons et al. | 521/54 |

*Primary Examiner*—Morton Foelak
*Attorney, Agent, or Firm*—Karl F. Ross; Herbert Dubno

[57] ABSTRACT

An elastic molded body comprising a cell structure consists of an elastic synthetic plastics material produced by a polyaddition reaction between a liquid diisocyanate or polyisocyanate and a reactant containing at least 18 percent by weight polybutadiene. Elastic hollow microspheres having thin shells consisting of a vinylidene chloride copolymer are embedded within this synthetic plastics material and are firmly and unseparably connected with the elastomeric synthetic plastics material, the hollow microspheres, the interior of which contains a gas, forming closed cells within the synthetic plastics material. These hollow microspheres can be formed in situ within the synthetic plastics material when producing the molded body by inflating compact particles of a vinylidene chloride copolymer and containing an inflating agent under the influence of heat, particularly under the influence of the heat of reaction generated. The hollow microspheres have a diameter between 10 and 100 micrometer. A crosslinking agent, for example butane-diol-1,4, a catalyst, pigments and/or plasticizers can be added to said reactant.

15 Claims, No Drawings

ELASTIC MOLDED BODY COMPRISING A CELL STRUCTURE AND PROCESS FOR PRODUCING SUCH A MOLDED BODY

BACKGROUND AND SUMMARY OF THE INVENTION

The invention refers to a molded body comprising a cell structure and consisting of an elastomeric synthetic plastics material. The invention further refers to a process for producing such a molded body.

The molded body according to the invention shall primarily be used for shoe soles and in particular for shoe soles subjected to severe wear, i.e. for example soles of climber boots, golfer boots, field service boots and worker boots. The molded body according to the invention can, however, also be used for other purposes, above all for purposes in which the molded body is subjected to severe wear, i.e. for example for motor vehicle tires.

It is already known to produce soles and other shoe parts of polyurethane by a polyaddition reaction of liquid reactants resulting in an elastic solid molded body. Up till now the reactants used were polyisocyanates and polyesters or polyethers containing OH-groups. Foaming was effected by adding a liquid of low boiling point or by means of $CO_2$, thereby obtaining a foam at least partially comprising open cells. Shoe soles produced in such a manner suffer from substantial drawbacks. For example, the danger of fracture under the influence of heat and humidity is very great and the shoe soles become frequently fractured after only few days. Particularly soles consisting of polyether-polyurethane have in addition a low cold elasticity, so that these shoe soles frequently become fractured for this reason on occurrence of low temperatures, and this particularly if the soles were previously contacted with alcaline or acidic media or with humidity under heat. Destruction of the known shoe soles is further enhanced by road dust and dirt entering the open cells and rupturing the thin cell walls during the rolling movement on walking.

The high water resorption capacity of the know shoe soles represents a further drawback being responsible for the uncontrollably changing values of the electric resistance. Such soles can thus not be used for workers boots which shall have insulating properties. Furthermore, the mentioned drawbacks prohibit the use of the known soles of foamed polyurethane at those locations where the soles are subjected to extreme temperature conditions in the presence of humidity.

It is an object of the present invention to provide a molded body comprising a cell structure and having a low apparent density. It is a further object of the invention to provide a molded body which does not absorb water or absorb water in only a small amount and which has an outstanding stability against hydrolysis. The molded body according to the invention shall further be resistant against alcaline and acidic media. It is a further object of the invention to provide a molded body of high inflammability and having outstanding elastic properties on pressure stress. When using a molded body according to the invention as a shoe sole, it is a further object of the invention to give the shoe sole a high sliding resistance even at low temperatures and the desired electrical insulating properties. It is a still further object of the invention to produce a molded body intended to be used as a shoe sole such that shoes provided therewith can without any risk be used as climbers shoes, sporting shoes, workers shoes, safety shoes and field service shoes.

EXAMPLE

When producing a molded body according to the invention which is intended to be used as a shoe sole for golfer shoes, the procedure is as follows:

Into 50 g polybutadiene comprising terminal OH-groups there are added under stirring 10 g butandiol-1,4 as a crosslinking agent and 4 g of minute compact particles of a vinylidene chloride copolymer and having enclosed therein an inflating agent as well as 0.3 g of a catalyst. The compact particles of vinylidene chloride copolymer and having enclosed therein an inflating agent are known under the trade mark "EXPANCEL" and can be obtained at the firm Kema-Nord in Sundsval (Sweden). The polybutadiene comprising terminal OH-groups was of the type which can be obtained under the trade mark "POLY BD" from Metallgesellschaft Aktien-gesellschaft in Frankfurt/Main.

The thus produced component is intensely and briefly mixed with 50 g of a diisocyanate having an NCO-Content of 19 percent, whereupon the mixture is filled into a metal mold and the metal mold is brought to a temperature of approximately +70° C. After the filling operation the mold was closed. Approximately three minutes after the molded body representing a shoe sole was ready for being removed from the mold.

The reaction heat generated during the formation of the molded body resulted in a temperature increase to approximately 110° C. and in the production of hollow microspheres within the molded body from the compact particles used in an amount of approximately 4 percent of the total weight, said microspheres having thin shells of the vinylidene chloride copolymer and containing within their interior a gas. These hollow microspheres represent closed cells so that the molded body produced nearly exclusively contains, in contrast to known molded bodies of polyurethane having been produced with the use of polyols on the basis of esters or ethers as the reactants being hygroscopic in nature and allow the use of water as a foaming agent, closed cells which do not absorb water. The molded body produced showed a density of 0.42 and the elasticity on compressions stress and tension stress as well as the elongation on fracture remained unchanged after storing in warm water of +75° C. during 20 days. In contrast thereto, the mechanical properties of a known molded body of the mentioned type were reduced for more than 50 percent under identical conditions. The outstanding properties of the molded body according to the invention with respect to its elasticity on pressure stress are obtained in view of the hollow microspheres comprising thin elastic shells of a vinylidene chloride copolymer and containing within their interior a gas which can not escape. The outstanding stability of a molded body according to the invention against hydrolysis and its satisfactory resistance against alcaline and acidic media is equally obtained on account of the fact that the molded body scarcely allows penetration of water and dirt on account of the closed hollow microspheres. This molded body still has a low density. The molded body according to the invention is in addition difficultly inflammable on account of its high volumetric content in hollow microspheres, the shells of which are incombustible.

When producing a molded body according to the invention, pigments, plasticizers or the like can be added to the reactant consisting of polybutadiene.

Furthermore, it is possible that said reactant only partially consist of polybutadiene, namely of a mixture of polybutadiene with a polyol such as a polyester or a polyether. It is, however, essential that this reactant contains at least 18 percent by weight of polybutadiene. The hollow microspheres hae differing diameters being within the range of 10 to 100 micrometer.

The production of the mixture of the reactant containing the polybutadiene and of the diisocyanate or polyisocyanate can be effected by means of known polyurethane processing equipment.

It is also possible to produce in a manner known per se from the reactants a prepolymer which is subsequently rigidified with any desired crosslinking agents. In this case, the hollow microspheres or, respectively, the compact particles forming the hollow microspheres are admixed with the liquid crosslinking agent, for example the butanediol-1,4.

When producing a molded body according to the invention, reinforcing means and/or means for fixing parts to the molded body, for example means for fixing the shoe upper to the shoe sole, may be embedded within the molded body. These means are, for example, inserted into the mold and fixed therein in the desired position before filling the mixture into the mold.

It is furthermore also possible to foam, during production of the molded body, the molded body onto other articles and thus to connect, for example, a shoe sole directly with a shoe upper during the foaming operation.

The mixture of the reactant containing polybutadiene and of the diisocyanate or polyisocyanate can also be introduced into a cold mold or into an only slightly heated mold, in which case the heat of reaction generated within the mold is partially absorbed by the mold. Molded bodies produced in this manner show a compact or nearly compact surface and a cell structure in their interior. Such molded bodies have, in addition to the known properties, an improved suitability for being subjected to a finishing operation and are particularly well suited for parts subjected to severe wear such as soles for climbers boots.

It is within the scope of the present invention to add to the reactant containing the polybutadiene, in addition to the minute compact particles giving rise to the formation of the mentioned hollow microspheres, liquid inflating agents such as for example fluorinated hydrocarbons and/or smallest amounts of water, which, just as is the case with known molded bodies, give rise to the formation of at least partially open cells, so that a molded body thus obtained contains closed cells formed by the hollow microspheres as well as open cells.

What we claim is:

1. An elastic molded body comprising a cell structure and consisting of an elastomeric synthetic plastics material produced by a polyaddition reaction of a liquid diisocyanate or polyisocynate with a reactant containing at least 18 percent by weight polybutadiene selected from the group which consists of polybutadiene having terminal hydroxy groups, a polybutadiene blended with a polyol, a polybutadiene blended with a polyester, a polybutadiene blended with a polyether and a polybutadiene blended with butane-diol-1,4 and having embedded therein elastic hollow microspheres the thin shells of which consist of a vinylidene chloride copolymer and are firmly and unseparably connected with the elastomeric synthetic plastics material and the interior of which contains a gas, said hollow microspheres forming closed cells within the synthetic plastics material.

2. A molded body according to claim 1 wherein the reactant consists of a mixture of polybutadiene blended with a polyol.

3. A molded body according to claim 2 wherein the reactant consists of a mixture of polybutadiene blended with a polyester.

4. A molded body according to claim 2, wherein the reactant consists of a mixture of polybutadiene blended with a polyether.

5. A molded body according to claim 1 wherein the reactant has added thereto a crosslinking agent.

6. A molded body according to claim 5 wherein the crosslinking agent consists of butane-diol-1,4.

7. A molded body according to claim 1 wherein the reactant has added thereto a catalyst.

8. A molded body according to claim 1 wherein the reactant had added thereto pigments.

9. A molded body according to claim 1 wherein the reactant had added thereto a plasticizer.

10. A molded body according to claim 1 wherein the reactant had added thereto liquid inflating agents giving rise to the formation of at least partially open cells in addition to the closed cells.

11. A molded body according to claim 10 wherein fluorinated hydrocarbons are used as the inflating agent.

12. A molded body according to claim 10 wherein water is used as the inflating agent.

13. A molded body according to claim 1 wherein the hollow microspheres have a diameter between 10 and 100 micrometers.

14. Process for producing from an elastomeric synthetic plastics material an elastic molded body having a cell structure, said process comprising the steps:
   minute compact particles of a vinylidene chloride copolymer containing an inflating agent are added to a reactant containing at least 18 percent by weight of polybutadiene and are mixed with said reactant;
   the reactant comprising the compact particles is intensely mixed with a diisocyanate or a polyisocyanate;
   the mixture thus formed is filled into a mold which is closed after the filling operation;
   the said mixture is allowed to completely react within the mold, thereby generating from the compact particles by the heat of reaction produced and/or by heat supply hollow microsperes comprising thin shells of vinylidene chloride compolymer and containing within their interior a gas;
   subsequent to the terminated reaction the finished molded body is removed from the mold.

15. Process for producing from an elastomeric synthetic plastics material an elastic molded body having a cell structure, said process comprising the steps:
   minute compact particles of vinylidene chloride copolymer containing an inflating agent are added to a reactant containing at least 18 percent by weight of polybutadiene and are mixed with said reactant;
   the mixture of reactant and compact particles (containing an inflating agent) thus formed is heated to a temperature of at least 90° C. thus generating from the compact particles hollow microspheres the thin shells of which consist of a vinylidene chloride copolymer and the interior of which contains a gas;

the reactant provided with the hollow microspheres is intensely mixed with a diisocyanate or a polyisocyanate;

the mixture thus formed is filled into a mold which is closed after the filling operation;

the said mixture is allowed to completely react within the mold;

after the end of the reaction the finished molded body is removed from the mold.

* * * * *